United States Patent [19]

Makino et al.

[11] Patent Number: 5,388,251
[45] Date of Patent: Feb. 7, 1995

[54] HELP DISPLAY SYSTEM FOR A COMPUTER

[75] Inventors: Fusao Makino, Kyoto; Matsutaka Ito, Yamatokoriyama; Hiroyuki Nagasawa; Katsunori Takeda, both of Nara, all of Japan

[73] Assignee: Sharp Kabushiki Kaisha, Osaka, Japan

[21] Appl. No.: 268,501

[22] Filed: Nov. 8, 1988

[30] Foreign Application Priority Data

| Nov. 9, 1987 | [JP] | Japan | 62-282725 |
| Nov. 9, 1987 | [JP] | Japan | 62-282726 |
| Nov. 9, 1987 | [JP] | Japan | 62-282727 |
| Nov. 9, 1987 | [JP] | Japan | 62-282728 |
| Dec. 3, 1987 | [JP] | Japan | 62-306183 |

[51] Int. Cl.⁶ ................ G06F 11/30; G06F 15/40
[52] U.S. Cl. ................... 395/575; 395/425; 395/700; 395/115; 395/155; 364/265; 364/265.5; 364/283.1; 364/283.2; 364/284.3; 364/286.1; 364/DIG. 1
[58] Field of Search ............ 364/DIG. 1, DIG. 2; 395/700, 275, 400, 425, 575, 115, 155

[56] References Cited

U.S. PATENT DOCUMENTS

| 4,491,933 | 1/1985 | Ursin et al. | 364/900 |
| 4,648,062 | 3/1987 | Johnson et al. | 364/900 |
| 4,754,326 | 6/1988 | Kram et al. | 364/900 |
| 4,782,463 | 11/1988 | Sanders et al. | 364/900 |
| 4,798,945 | 1/1989 | Bruckner et al. | 235/479 |
| 4,864,530 | 9/1989 | Hatta et al. | 364/900 |
| 4,899,276 | 2/1990 | Stadler | 364/300 |
| 4,918,930 | 4/1990 | Gaudet et al. | 62/55.5 |
| 4,964,077 | 10/1990 | Eisen et al. | 364/900 |

FOREIGN PATENT DOCUMENTS

| 62-49528 | 11/1988 | Japan . |
| 62-90756 | 11/1988 | Japan . |
| 61223923 | 11/1988 | Japan . |
| 61234426 | 11/1988 | Japan . |
| 61243517 | 11/1988 | Japan . |
| 61243518 | 11/1988 | Japan . |

*Primary Examiner*—Thomas C. Lee
*Assistant Examiner*—M. N. Von Buhr

[57] ABSTRACT

A display for use in a computer, for example a word processor or a personal computer, includes a device for forming a help message on the display. The help message can provide help when an error occurs in operation. Also a help message can be provided for a current mode when a help key in depressed thus assisting the operators even though there is no error.

11 Claims, 13 Drawing Sheets

FIG. 4A

TEXT IS PRINTED ACCORDING TO THE FORMAT IN THE TEXT.
EXECUTION KEY : DISPLAY IN WHICH PRINTING CONDITIONS OF ORDINARY PRINTS ARE SET IS SHOWN.

RELEASE KEY : RETURN TO TEXT PRODUCING DISPLAY.
→ OR ← KEY : SHIFT TO NEXT ITEM.

FIG. 4B

FUNCTION TO PRINT IN A GIVEN AREA SUCH AS THE ORIGINAL PAPER AT FIXED INTERVALS.
(TYPICAL PRINTING CAN NOT BE SELECTED AT IDLE FEEDING.)
EXECUTION KEY : DISPLAY IN WHICH PRINTING CONDITIONS OF TYPICAL PRINTS ARE SET IS SHOWN.

RELEASE KEY : RETURN TO TEXT PRODUCING DISPLAY.
→ OR ← KEY : SHIFT TO NEXT ITEM.

FIG. 4C

ONLY ONE LINE INVOLVING THE CURSOR CAN BE PRINTED.
EXECUTION KEY : DISPLAY IN WHICH PRINTING CONDITIONS OF ONE LINE PRINTS ARE SET IS SHOWN.
(PRINTING STARTS AT IDLE FEEDING.)

RELEASE KEY : RETURN TO TEXT PRODUCING DISPLAY.
→ OR ← KEY : SHIFT TO NEXT ITEM.

INPUT THE PRINTING START PAGE.
NUMERAL KEY : INPUT THE PRINTING
START PAGE.
EXECUTION KEY : START PRINTING.

FIG. 6A

THE KEY OTHER THAN EXECUTION OR RELEASE KEY IS DEPRESSED.
EXECUTION KEY : SHIFTS TO THE PRINT ITEM SELECT DISPLAY.
RELEASE KEY : RETURN TO ITEM SELECT DISPLAY FOR PREPARING A DIRECTORY, ADDRESS LIST AND ADDRESS PRINT.
☞ EXPLANATION IS ENDED BY DEPRESSING THE HELP KEY.

FIG. 6B

THE KEY OTHER THAN EXECUTION OR RELEASE KEY IS DEPRESSED.
DEPRESS THE CORRECT KEY ONCE AGAIN.
EXECUTION KEY : PRINT STARTS.
RELEASE KEY : RETURN TO ITEM SELECT DISPLAY FOR PREPARING A DIRECTORY, ADDRESS LIST AND ADDRESS PRINT.
☞ EXPLANATION IS ENDED BY DEPRESSING THE HELP KEY.

FIG. 6C

SINCE THE CURSOR IS AT FORMAT SETTING MARK OR IN THE NO INPUT AREA, TEXT EXAMPLES CAN NOT BE CALLED. EXECUTE TEXT EXAMPLE CALL ONCE AGAIN AFTER MOVING THE CURSOR FROM FORMAT SELECT MARK OR NO INPUT AREA TO OTHER POSITION.
☞ EXPLANATION IS ENDED BY DEPRESSING THE HELP KEY.

FIG. 7

| EXPLANATION OF TERMINOLOGIES | LESSON ON BASIC OPERATIONS |
| --- | --- |
| ~~EXPLANATION OF HELP KEY~~ | EXPLANATION OF OTHER KEYS. |

SELECT BY → KEY OR ↓ KEY, AND DEPRESS EXECUTION KEY.

USE HELP KEY IN THE FOLLOWING CASES.
(HELP) 1
WHEN THE MEANING OF SOME KEY IS NOT CLEAR IN THE TEXT PRODUCING DISPLAY.
DEPRESS HELP KEY AND DEPRESS THE KEY.
EXPLAIN THE KEY.

FIG. 8B (HELP) 2
DURING THE OPERATION, WHEN YOU ARE LOST OR FORGOT HOW TO OPERATE SUBSEQUENT OPERATIONS.
DEPRESS HELP KEY. EXPLAIN HOW TO OPERATE.

FIG. 8C (HELP) 3
WHEN YOU HEAR ONLY ERROR BUZZING AFTER DEPRESSING THE KEY AND ARE LOST HOW TO OPERATE.
DEPRESS HELP KEY. EXPLAIN THE CAUSE OF ERROR.

EXPLANATION OF TERMINOLOGIES

SELECT THE LINE WHERE A CAPITAL LETTER OF THE TERMINOLOGY PRESENTS BY → KEY, AND DEPRESS THE EXECUTION KEY.

FIG. 9B

26 —— PRINT FOR ADDRESS

EXPLANATION OF TERMINOLOGIES    LINE A 1

| | | |
|---|---|---|
| | PATTERNING OF BACKGROUND | PRINT FOR 1 LINE |
| CHARACTERS IN 1 LINE | TEMPORARY REGISTRATION | DESIGNATION OF PRINT START POSITION |
| DESIGNATION OF PRINT START PAGE | CHANGE OF PRINT-LETTER STYLE | |

FIG. 9C (PRINT FOR ADDRESS)   FUNCTION TO PRINT THE ADDRESS IN AN OFFICIAL POST CARD AUTOMATICALLY. MUST BE INPUTTED ACCORDING TO A GIVEN FORMAT.

(HOW TO OPERATE)   DEPRESS FUNCTION 2 KEY AND SPECIAL FUNCTION KEY SIMULTANEOUSLY. SHIFT TO CONTROL OF ADDRESS BY → KEY AND EXECUTE. FURTHER SHIFT TO PRINT FOR ADDRESS BY → KEY AND EXECUTE.

FIG. 10A (PRINT STOP)    FUNCTION FOR SUSPENDING PRINTING.

(HOW TO OPERATE)    DEPRESS FUNCTION 1 KEY AND PRINT STOP KEY SIMULTANEOUSLY. DEPRESS EXECUTION KEY FOR RESTART AND RELEASE KEY FOR DISCONTINUATION.

FIG. 10B (HALF WIDTH)    FUNCTION FOR SELECTING FULL OR HALF SIZE OF THE WIDTH OF THE CHARACTER AND SYMBOL TO BE INPUTTED.

(HOW TO OPERATE)    DEPRESS FUNCTION 1 KEY AND HALF WIDTH KEY SIMULTANEOUSLY BEFORE INPUTTING THE CHARACTER. DISPLAY AS FULL OR HALF WIDTH.

FIG. 10C (DOUBLE WIDTH)    FUNCTION FOR EXPANDING THE CHARACTER WIDTH INDICATED BY THE CURSOR OR RETURNING IT TO THE ORIGINAL WIDTH.

(HOW TO OPERATE)    BRING THE CURSOR RIGHT TO THE CHARACTER AND DEPRESS FUNCTION 1 KEY AND DOUBLE WIDTH KEY SIMULTANEOUSLY.

HELP DISPLAY SYSTEM FOR A COMPUTER

BACKGROUND OF THE INVENTION

1. Field of the Invention

The present invention relates to a help display forming device which displays the explanation of terminologies and its operating method or the like on a display. This occurs when the operating method and so on are unknown to the user of a computer such as a word processor or a personal computer.

2. Description of the Prior Art

Conventionally, in large-scale computers, various error conditions are displayed by messages on a display when errors occur. In a word processor or the like, it is common that, when a specific key is depressed, a help mode is displayed. The help mode displays an explanation of how to correct errors that have occured.

For example, in Japanese Published Unexamined Patent Application No. SHO61(1986)-234426, there is disclosed a circuit for a business machine comprising a central processing unit, a first memory for storing operation programs of the central processing unit, a second memory for storing help messages and a help key. When the help key is depressed, this interrupts the control program and initiates the display of particular help messages which correspond to the particular conditions in that phase of the control program from the second memory which are then displayed on the screen.

In the aforesaid Publication, a function which indicates terminologies responsive to various functions included in the business machine at the request of the user is not disclosed.

In Japanese Published Unexamined Patent Application No. SHO62(1987)-49528, a help guide system is shown in which the guide explanation and help explanation are displayed at the user's request, including the explanation of technical expressions or terminologies such as "tab", "indent", "rule", etc., which may not be familiar to the user can be displayed when the user designates them.

In the aforesaid system, only the explanation of the terminology in the guide or help explanation is included, but explanation of certain other terminologies can not be indicated independently.

Furthermore, in Japanese Published Unexamined Patent Application No. SHO61(1986)-223923, an information processing apparatus is disclosed which comprises an analytical functions component for analyzing the sequence or history of input operation or error information, a help information retrieval function component for retrieving help information of a command corresponding to the analyzed result obtained by the analytical function component, and a necessary item extract function component for extracting and displaying only the necessary item corresponding to the analyzed result among the help information retrieved by the help information retrieve function component, and displays help information including the command, directions for use, etc., when the command input operation in any way is hindered or error information is generated by a particular command.

In the aforesaid apparatus, however, the help information displayed is only for the error which occurs at command input, but those for the error responsive to the operational error of input devices such as a keyboard are not indicated.

The present invention has been devised in view of the above described problem. One object thereof to provide a help display forming device capable of explaining to the user simply and quickly on demand, unknown points about the operation of the system when specific operational errors occur.

SUMMARY OF THE INVENTION

The present invention relates to a help display forming device comprising key input means, display means for displaying data, error detecting means for detecting an operational error of the key input means, first memory means for storing explanations of operating methods of the key input means, second memory means for storing a terminology index consisting of capital letters of terminologies, third memory means for storing a plurality of terminologies corresponding to the capital letters, fourth memory means for storing explanations of functions of the terminologies and operating methods for executing the functions, cursor means for designating the desired location of data displayed on the display means, at least one help key, and control means for controlling display of the display means, wherein the control means has a function for displaying the content associated with an error in the first memory means on the display means, when the error detecting means is operated and the help key is operated once, and a function for displaying the terminology index stored in the second memory means on the display means when the same or different help key is operated twice successively, for displaying the terminologies in the third memory means corresponding to the capital letter designated by the cursor means in the terminology index displayed on the display means, and for displaying the stored content of the fourth memory means corresponding to the terminology designated by the cursor means among the terminologies displayed on the display means.

The device of the present invention has a function whereby when the operational error occurs and is duly detected, the correct operation is displayed once the help key is depressed but if the help key is depressed twice in the case that the operation is unknown or misunderstood, the terminology index related to the content of the operation is displayed. The desired directions are displayed simply and quickly if a predetermined terminology is designated in the index.

The help display forming device of the present invention may further include fifth memory means for storing the explanations of key function of the key input means and operating methods for executing its functions, and the control means have a function for displaying the stored content of the fifth memory means corresponding to the key of the key input means operated by depressing the help key once on the display means.

By such a configuration, the user can easily grasp the desired key function, and it is especially easy for a beginner to operate.

The help display forming device of the present invention may also include detecting means for detecting that the key input means has been operated incorrectly more than twice, and the control means has a function for displaying the stored content of the first memory means corresponding to the operational error detected by the operation of the detecting means.

BRIEF DESCRIPTION OF THE DRAWINGS

FIGS. 4A, 4B and 4C are views showing displays of state explanation messages in the embodiment respectively, FIGS. 6A, 6B and 6C are views showing displays of error reason messages in the embodiment respectively, FIG. 7 is a view showing a help mode selection display in the embodiment, FIGS. 8A, 8B and 8C are views showing help function selection message displays in the embodiment respectively, FIGS. 9A, 9B and 9C are view showing terminology explanation message displays in the embodiment respectively, and FIGS. 10A, 10B and 10C are views showing key explanation message displays in the embodiment respectively.

In FIGS. 4-10 aforementioned, in respective displays in practice, Japanese characters corresponding to English meaning (translation) shown displayed.

DETAILED DESCRIPTION OF THE PREFERRED EMBODIMENT

Key input means in the present invention usually comprises a keyboard having alphabetical keys or alphabet/kana keys for inputting Japanese, numeral keys and a plurality of function keys, an interface with a microcomputer and control programs. Arrangements of respective keys on the keyboard may be those known in the art, or in the Japanese version, may be arranged in Japanese alphabetical order (kana).

Display means is constituted by, for example, a CRT, liquid crystal display panel, its driving circuit and interface with a microcomputer.

Error detecting means, in ordinary text input and function input modes, compares whether or not the inputtable key is operated with information stored in advance to determine if an operational error of the key input means has occurred and when an error has been detected by disagreement of the compared result, also includes a function to inform the user the occurrence of an error by the sound of an electronic buzzer or by displaying characters on the display means.

Terminology used in the present invention means the heading word showing various functions of the device. In the second memory means, terminology indexes in which capital letters of the terminologies are arranged respectively in alphabetical order or in Japanese alphabetical order, for example, a, ka, sa, ta, na, ..., (kana) read laterally are stored. In response thereto, in the third memory means, a plurality of terminologies corresponding to capital letters are stored, and in the fourth memory means, explanations about the functions of the terminology and the operating method for executing the functions are stored.

Cursor means comprises a plurality of cursor key in the key input means, a circuit for indicating the cursor on the display means and control programs, and includes a function for moving the cursor indicated on the display means by the operation of the cursor key.

Control means comprise basically a microcomputer and a memory such as a ROM for storing programs for controlling the display means.

Help key comprises at least one key, and preferably positioned at a distance from various keys of the key input means for inputting the text. The help key may also comprise two keys which are distinguished as the first help key and second help key.

According to the aforesaid configuration, when the user has performed the same operational error twice, the explanation corresponding to that particular operational error is displayed automatically, and therefore the operation is convenient to use.

One embodiment of the present invention will be explained in conjunction with a Japanese word processor as follows.

Figure 1:
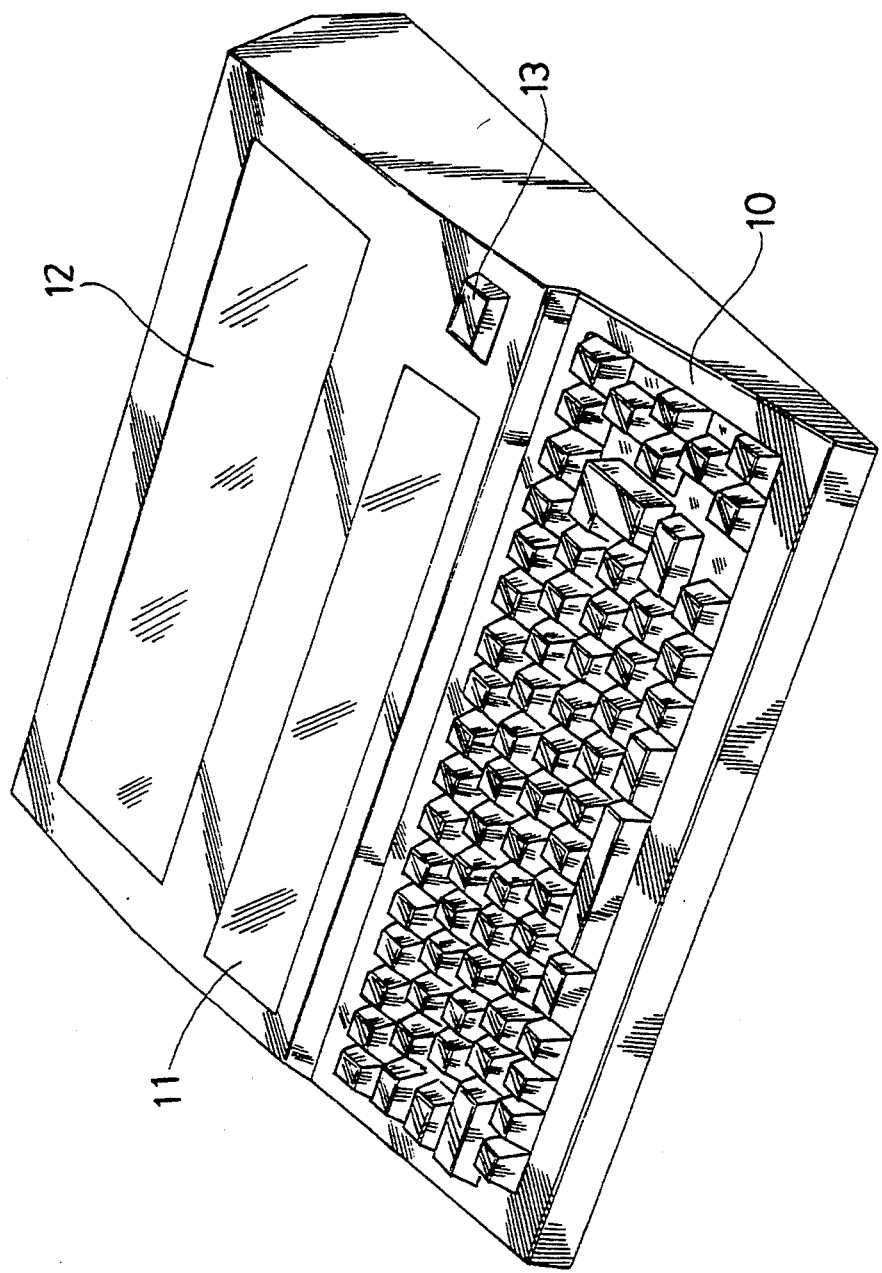
FIG. 1 is a perspective view of an embodiment of the present invention.

In FIG. 1, numeral 10 denotes a keyboard including alphabet/kana (letter) keys, numeral keys, function keys and so on, 11 is a display unit such as a dot-matrix type liquid crystal display, 12 is a printer for printing texts generated and 13 is a help key positioned independently at a distance from the keyboard.

Figure 2:
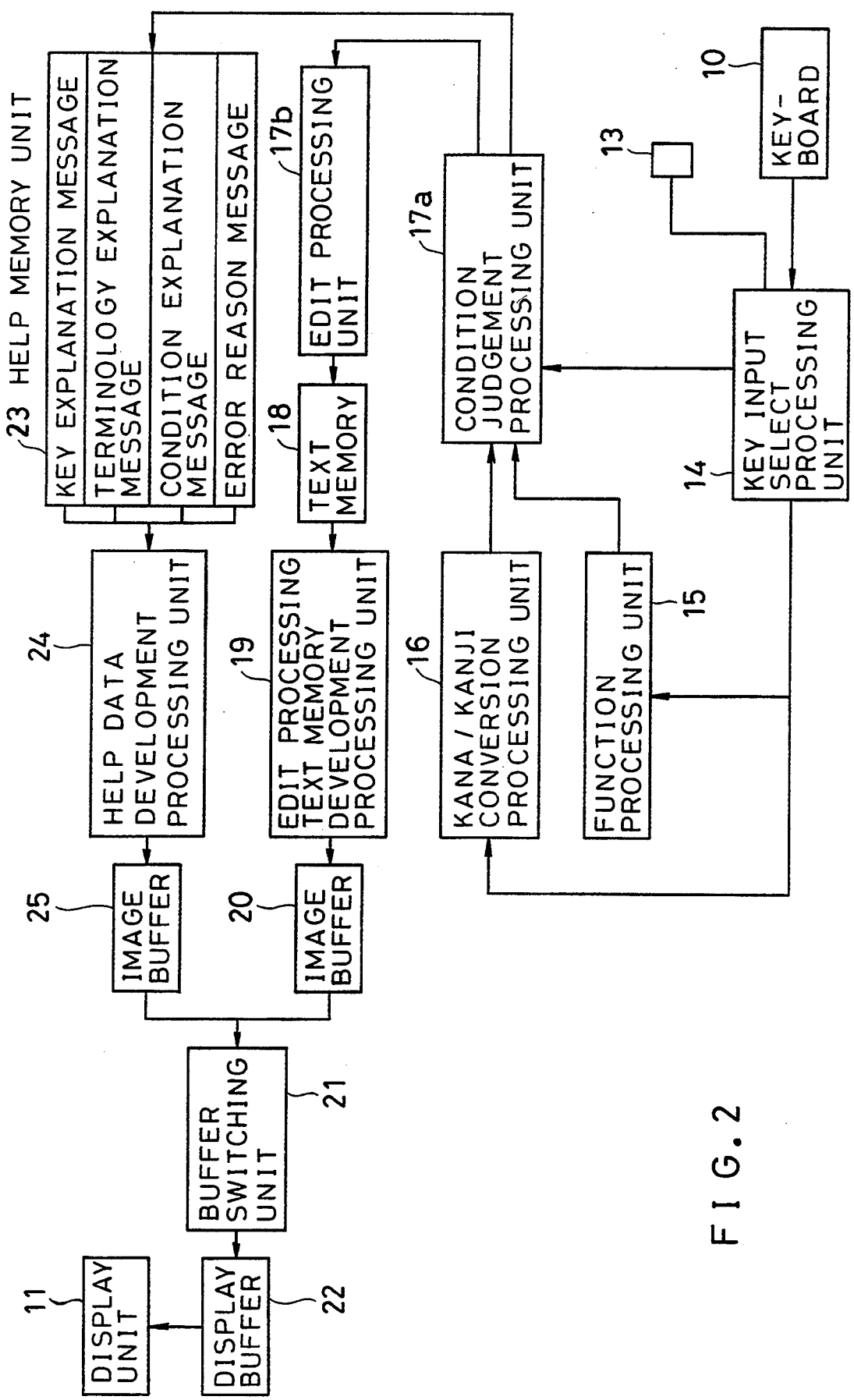
FIG. 2 is a block diagram showing the configuration of the embodiment.

FIG. 2 is a block diagram showing a configuration of the embodiment, in which 14 is a key input select processing unit which determines how to process character strings (data) and function signals inputted from the keyboard 10, and transfers the inputted character strings and function signals to either the function processing unit 15 or the kana/Chinese character conversion processing unit 16 or to a state judging processing unit 17a.

The function processing unit 15 is a unit for executing the edit processing function (i.e., right margin shifting, centering, copying, printing, etc.) defined on the keyboard 10, the kana/Chinese character conversion processing unit 16 is a unit for converting the transferred character string of kana or the like into the character string including kana and Chinese characters, and the state judging processing unit 17a is a unit for monitoring the input state at the time when the character string is inputted continuously in order to operate the help mode processing, which is initiated by the help signal sent from the key input select processing unit 14 and generated when the help key 13 is depressed, and by detecting the state when the input error has occurred more than twice (for example, twice) in succession.

17b is an edit processing unit which edits and processes the character string including kana and Chinese characters and stores it in a text memory 18. The character string stored in the text memory 18 is converted into bit image data for display in an edit processing text memory development processing unit 19 and also stored in an image buffer 20. The bit image data stored in the image buffer 20 is stored in a display buffer 22 via a buffer switching unit 21 and displayed successively on the display unit 11.

23 is a help memory unit which stores explanations (messages) corresponding to respective cases, when some function processing is displayed selectively (state help), when a character string or function signal which can not be received by the existing processing are sent (error help), when the help signal is generated in the ordinary kana/Chinese character conversion input processing state, and successively the function signal defined on the keyboard 10 is sent (key explanation help), and when the help signal is further generated in succession to the help signal in the ordinary kana/Chinese character conversion input processing state (terminology explanation help). Respective explanations stored in the help memory unit 23 are read by a help data processing development unit 24 and developed into bit image data and stored in an image buffer 25 when the help mode is initiated. The bit image data stored in the image buffer 25 is displayed by the display unit 11 via the buffer switching unit 21 and display buffer 22. Respective processing units aforementioned are constituted by a microcomputer.

Help mode defined herein is the mode which informs the user how to operate and cope with when the operation is incomprehensible due to unfamiliarity and counter-measures at the occurrence of error are unknown.

Furthermore, in the case other than the operation of the help key 13, the error help can be initiated in response to the detection of the state of error which has occurred twice in succession by the character string and function signal which have not been received by the existing processing.

Next, operations of the embodiment will be explained with reference to FIG. 3 to 10.

FIGS. 3A, 3B, 3C, 3D and 3E are flow charts showing operations of the embodiment. First, the operation of state help aforementioned will be explained.

When the text input mode is switched over to the function mode while the user is inputting the desired text (Steps 100, 101), a certain function key required is then depressed to call up the function mode. It is determined in this state whether the receivable key is operated (Step 102). The act of switching to the function mode is detected by the state judging processing unit 17a, which in turn waits for the input of the help signal. When the help key 13 is depressed in this state (Step 103), the help signal is inputted to the state judging processing unit 17a, and the state explanation message corresponding to the function key which has been depressed is read from the help memory unit 23 and processed by the help data development processing unit 24, then transferred to the display buffer 22 via the buffer switching unit 21 after having been stored in the image buffer 25. Bit image data stored in the display buffer 22 is displayed successively on the display unit 11 (Step 104). State explanation messages to be displayed comprise the text which explains the function of the function key which has been depressed, or in other words, which function is in the selected state, and explanation statements of the key executable in the displayed state of the state explanation message and the key function.

FIG. 4A is a display showing examples of the state explanation message displayed by operating the help key 13, when the function key of "Print" is operated and the ordinary print is selected in the selection display corresponding to the print function. Similarly, FIGS. 4B and 4C are displays showing examples of the state explanation message in the state where normal print and one line print are selected respectively in the selection display of corresponding to the print function. In the state where the state explanation message is displayed, it is determined whether the executable key (execution key, release key and cursor shift key in FIGS. 4A, 4B and 4C) is depressed (Step 105), and if the executable key is depressed its function is executed. That is, if the executable key is the execution key, the function in that state is executed, if it is the release key, release of the help mode and function mode is executed and if it is cursor shift key, cursor shift to the next item is executed respectively. If the executable key is not operated in Step 105 and the help key 13 is further depressed (Step 106), the processing returns to the initial state of the function mode and the key input is to be waited.

Figures 5A, 5B:
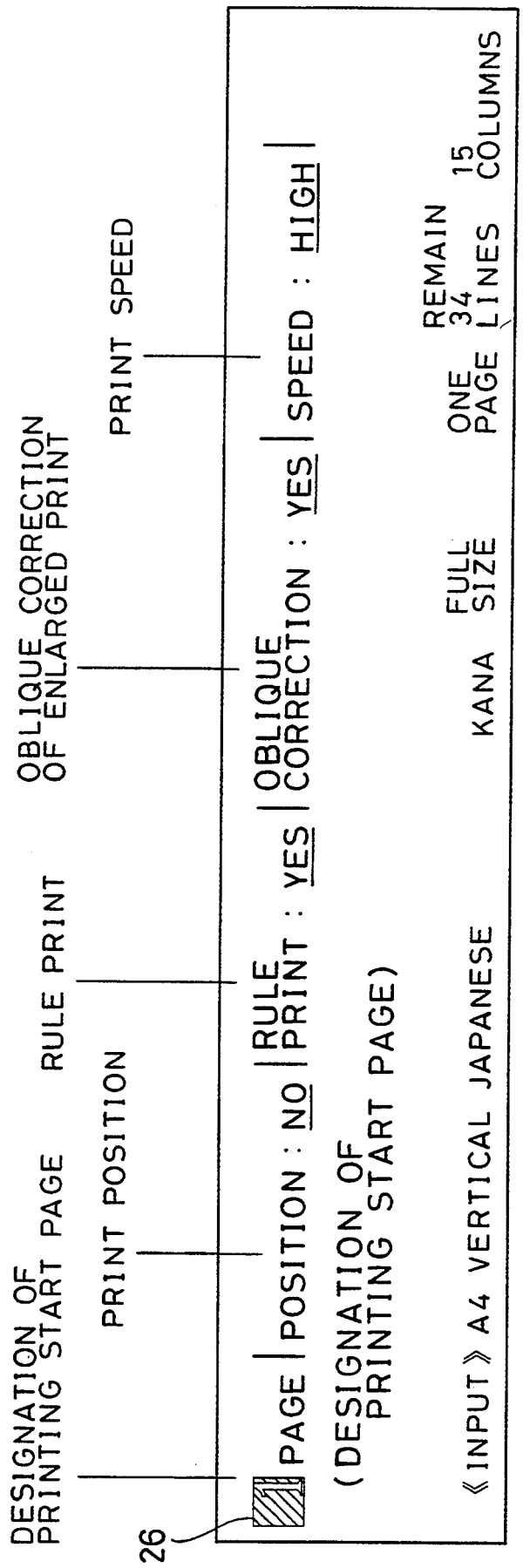
FIG. 5A is a view showing a display of print settings in the embodiment.
FIG. 5B is a view showing a display of the state explanation message when a help key is operated in the state of print setting display in the embodiment.

When the function key of the "Print" function is depressed and the help key 13 is also depressed in the print setting display shown in FIG. 5A, the state explanation message shown in FIG. 5B is displayed in Step 104. In the print setting display shown in FIG. 5A, since the cursor 26 is at a position designating print start page, the numeral key and execution key are shown as the executable keys in the state explanation message. If the user wants to execute the print function immediately in this state, he may operate the execution key and if the input for setting the print start line, he may operate the numeral key, when he does not want to set the executable keys but the item after the second one in the print setting display, he can return to the print setting display by depressing the help key 13 again. As a means to get out of the state help display, there are two methods, one is to operate the executable key shown in the display and the other is to operate the help key 13.

When the help key 13 is not depressed in Step 103, it is first determined whether or not the execution key is depressed (Step 107), and if it is, function processing is executed, and if the release key is depressed instead (Step 108), it returns to the initial state after releasing the function mode.

The operation of error help which is initiated when the keyboard 10 is operated incorrectly will now be explained.

The text input mode is determined in Step 100, and in Step 109 it is determined whether or not a key not receivable (execution is not possible by depressing the key at that point) is depressing. When the key not receivable is operated the error state is determined, and in Step 109A it is judged whether the error has occurred twice in succession.

When the error has occurred twice, the processing moves immediately to Step 111 and the error reason message is displayed.

When it is the first error, it is determined whether the help key operation or the key other than the help key 13 such as the error release key is inputted (Step 110). When the release key is depressed, it returns to Step 109 to detect the state of next key input. When the help key 13 is depressed, the processing moves to Step 111 to display the error reason message.

The error reason message is read from the help memory unit 23 in the same way as the case of the state help and displayed on the display unit 12 (Step 111). The error reason message which is displayed is composed of explanation statements of the reason corresponding to the error plus the receivable key and its function. It is determined whether the help key 13 is depressed to finish the explanation of the error help (Step 112), and if the help key 13 is depressed, the processing unit 14 waits for the next key input.

When the error has occurred in the function mode which is different from the aforementioned case, namely, when it is depressed the key not receivable, in Step 102 the error state is determined, and in Step 102A it is judged whether the error has occurred twice in succession. If it is the second error, the processing moves to Step 114 immediately to display the error reason message. When it is the first error, it is determined whether the help key operation or a key other than the help key 13 such as the error release key is depressed (Step 113). When it is the release key, the processing returns to Step 102 to detect the state of next key input. When the help key 13 is depressed, the error reason message is displayed in Step 114.

It is determined in Step 115 whether the help key 13 is depressed in succession to Step 114, and if it is depressed, the processing unit 14 waits for the next key input.

Figure 3A:
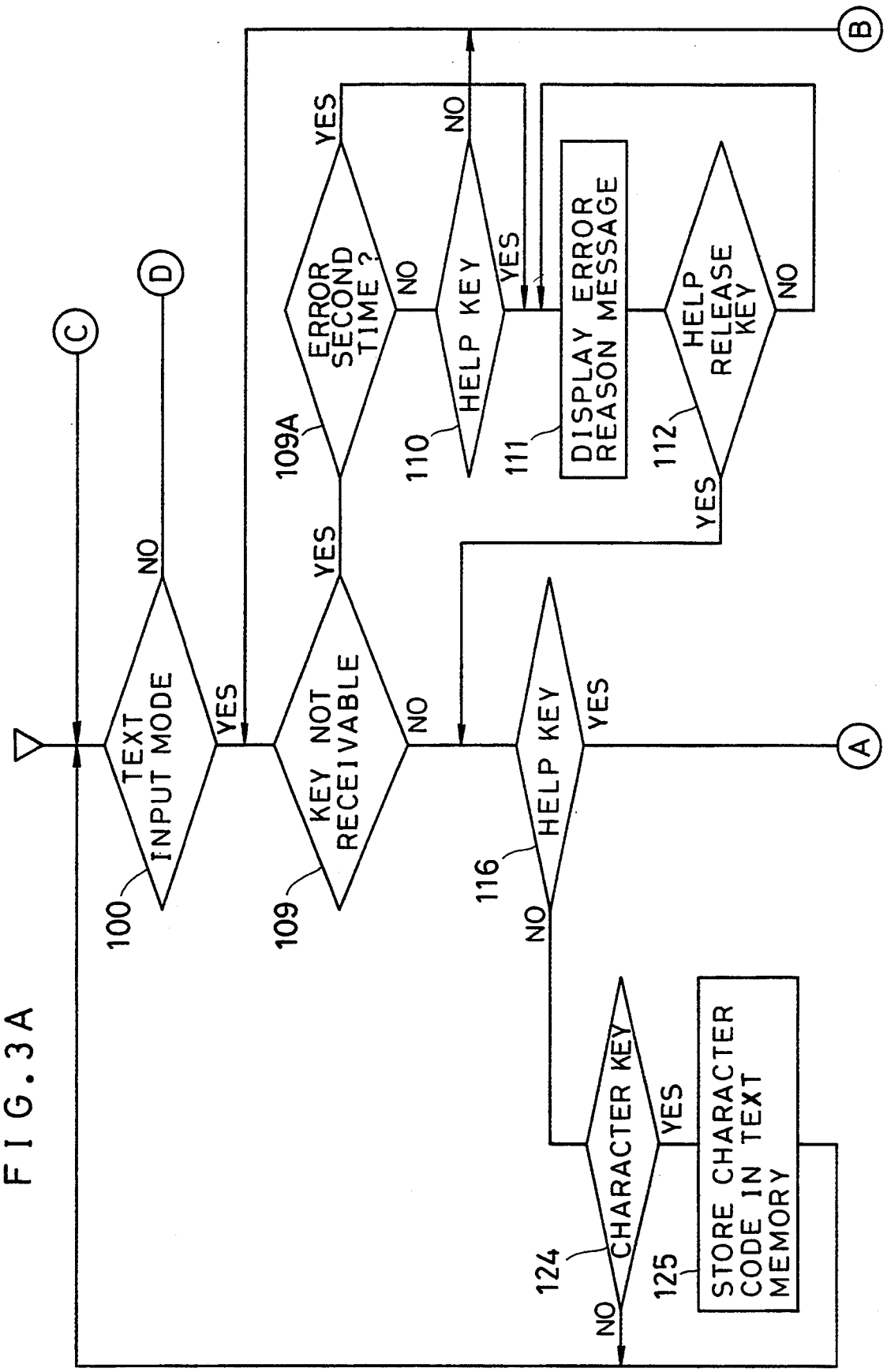
FIGS. 3A, 3B, 3C, 3D and 3E are flow charts showing operations of the embodiment.
Figure 3B:
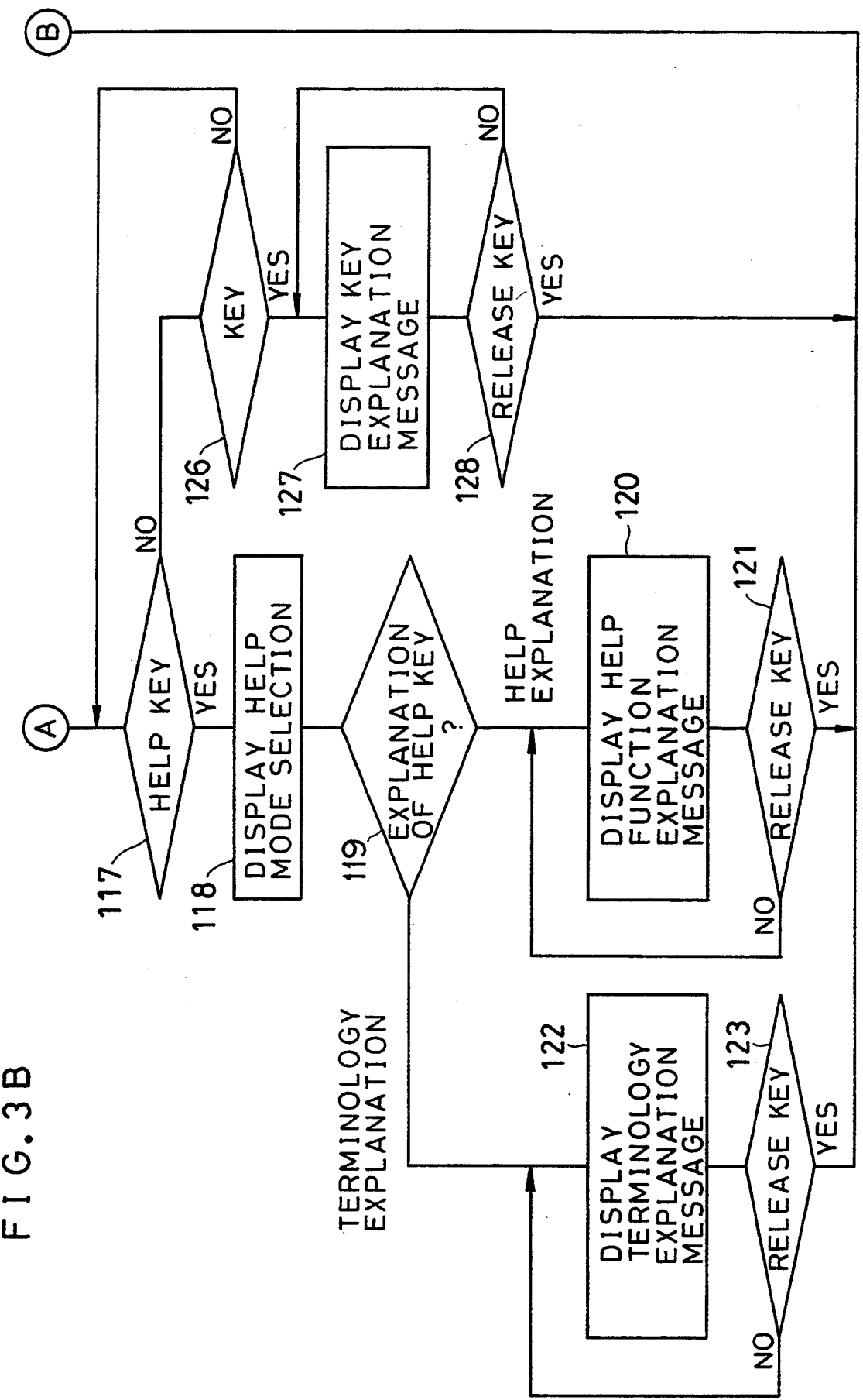
Figure 3C:
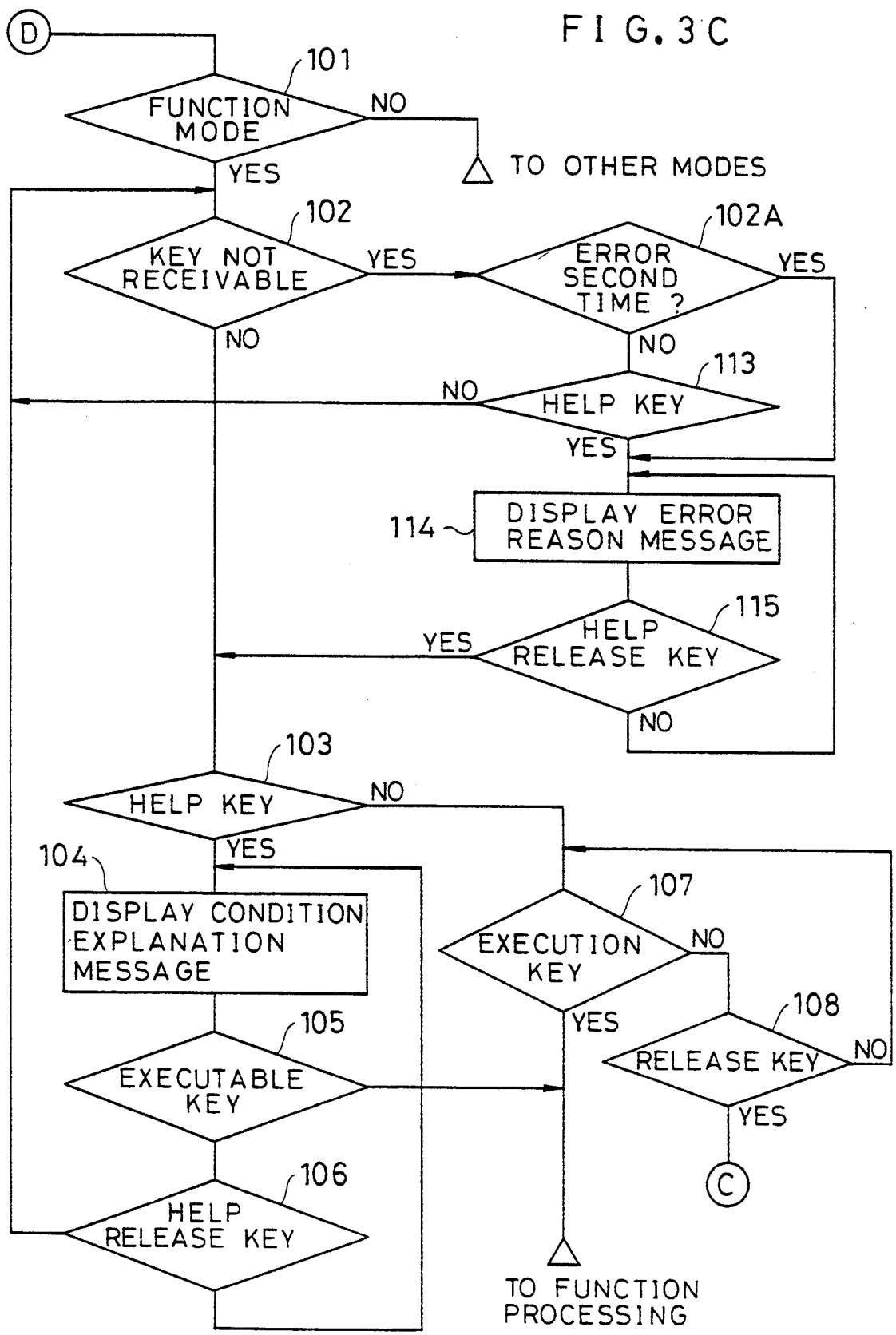
Figure 3D:
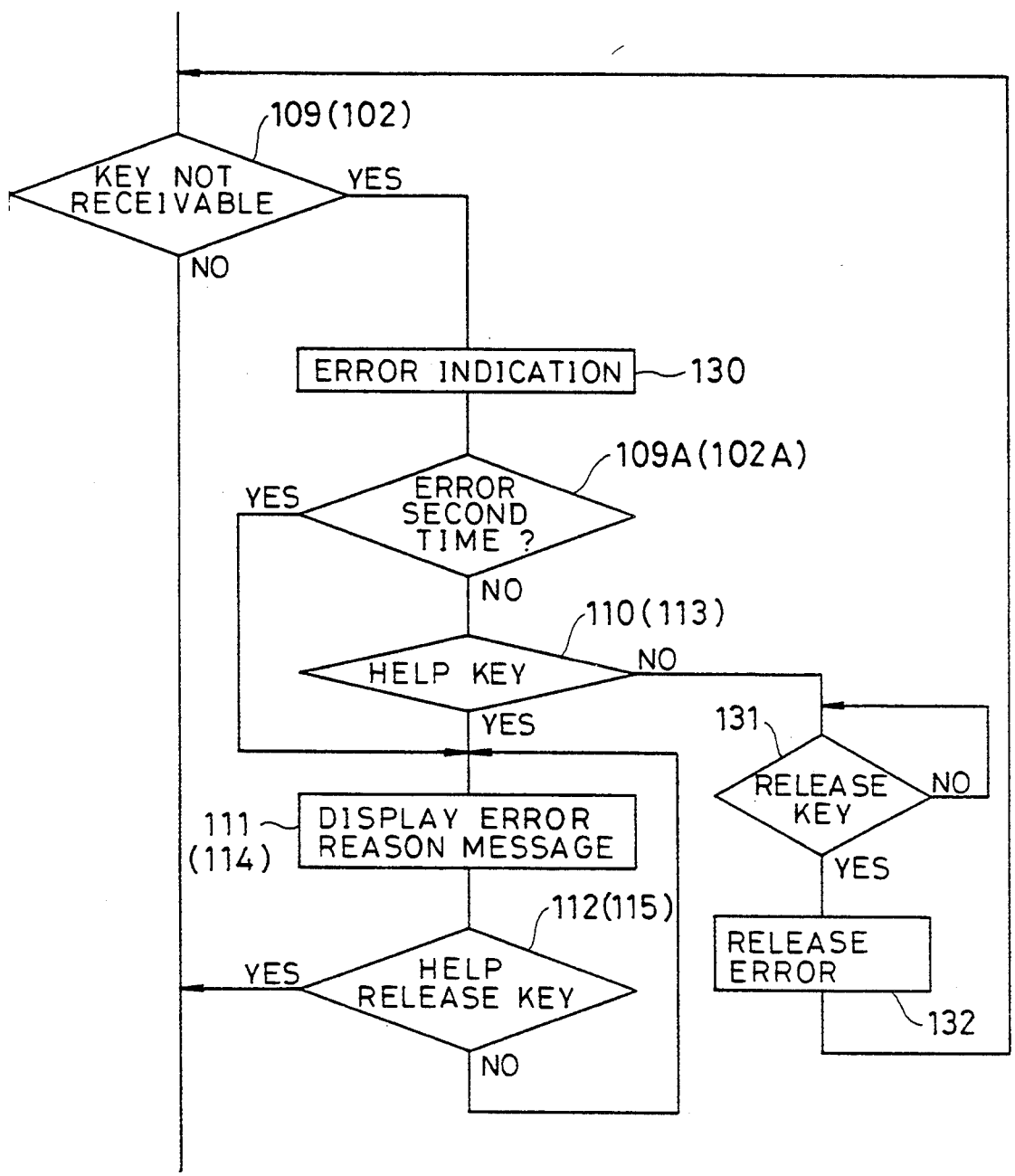

FIG. 3D is a flow chart showing the aforesaid error help operation more particularly when the error state is detected by determining the key not receivable in Step 109 (or 102), the error is indicated in Step 130. The user is informed acoustically by an electronic buzzer and the like, or simultaneously, "Error" may be displayed on the display unit 12. Thereafter, it is judged in Step 109A (or 102A) whether the error has occurred twice successively, if it is the second error, the processing moves immediately to Step 111 (or 114), and if it is the first error, it is judged whether the help key or the release key is depressed (Step 110 (113), Step 131). When the release key is depressed, the processing moves to Step 132 from Step 131 to release the error state and returns to Step 109 (or 102) to detect the next key input. When the help key is depressed, the processing moves to Steps 111 (or 114) and 112 (or 115).

It is a feature of the error help to display the error reason message automatically without depressing the help key 13 when the error has occurred twice successively to improve operating performance.

Displays showing examples of the error reason message in the function mode are shown respectively in FIGS. 6A, 6B and 6C. FIG. 6A is a display showing an example in which the key error has occurred in the selection display of directory lists in the function mode of "address management". FIG. 6B shows an example which is displayed at the directory list print stop in the function mode, and FIG. 6C shows an example displayed with respect to the error occurred in the selection display in the function mode of "calling of letter statement example".

Errors occurring in the respective cases above are communicated to the user acoustically by the electronic buzzer and the like, or simultaneously, an "error" may be displayed in the display unit 12.

Next, the function of help mode and the operation of the explanation of terminology will be explained.

In the text input mode, after determination in Step 109, whether or not the help key 13 has been depressed twice is determined (Step 116, 117). That is, when the help key 13 is depressed twice successively, it is switched to the help mode selection display as shown in FIG. 7 (Step 118). In the help mode selection display, when the cursor is moved to the display of "explanation of help key" by a cursor shift key and the execution key (Step 119), help function explanation messages as shown in FIGS. 8A, 8B and 8C are displayed in the display unit 12 (Step 120). The help function explanation message is a statement explaining how to operate the help key, and explains the help functions for three cases shown in FIGS. 8A, 8B and 8C. When the "explanation of help key" is selected, first the display of FIG. 8A is indicated, and thereafter, by operating the cursor shift key displays are scrolled and contents shown in FIG. 8B and 8C are displayed successively in the display unit 12. Then, it is determined whether the release key has been depressed in succession to Step 120 (Step 121), and when it is depressed, the processing unit 14 waits for the next key input when it is in the text input mode.

The operation of terminology explanation will now be explained.

First, in the help mode selection display in Step 118, the cursor 26 is moved to the display indicating the "explanation of terminologies" by the cursor shift key to depress the execution key. Thereby, the terminology explanation message is displayed (Step 122). Terminology explanation message displays are constituted by, as shown in FIGS. 9A, 9B and 9C, the index retrieval display of various terminology explanations, the index selection display of the terminology included in a line in which the capital letter designated the specific terminology to be selected by using the index retrieval display, and the explanation display for explaining the function and operation of the terminology selected by the index selection display.

Figure 3E:
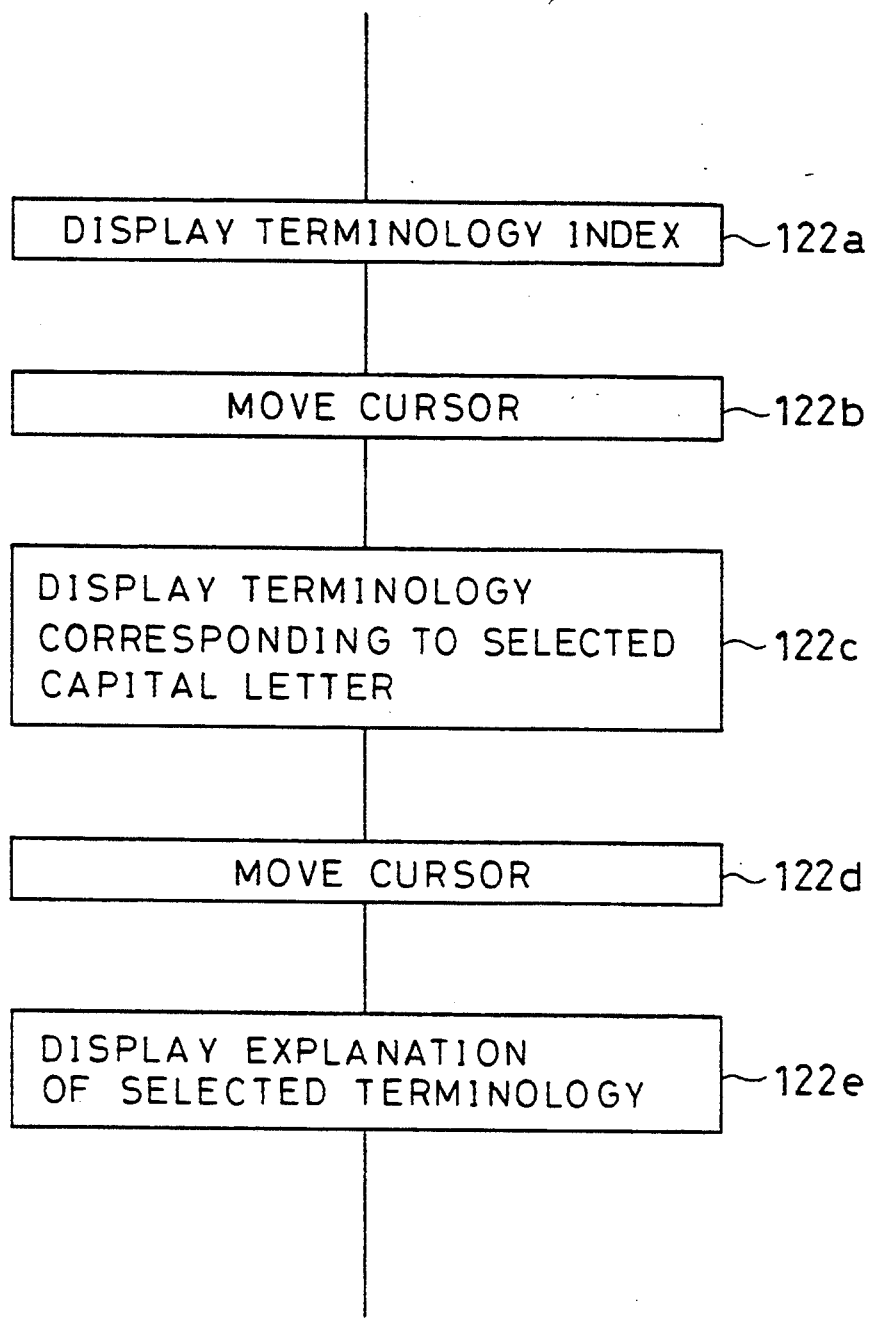

FIG. 3E is a flow chart showing the terminology explanation message display (Step 122) more particularly. First, the terminology index is displayed in the display unit 11 (Step 122a). In the terminology index display or index retrieval display, the capital letters of terminologies are displayed such as, a, ka, sa, ta, na . . . , Japanese alphabets (kana) read horizontally. When the user moves the cursor 26 to the desired character display by operating the cursor shift key for retrieval and depressed the execution key (Step 122b), the display on the display unit 11 is switched to the index selection display or listing display of the terminologies corresponding to the selected character. It is assumed that a line is selected here. When the cursor shift key is depressed to move the cursor 26 to the desired terminology display in the index selection display and when the execution key is depressed (Step 122c), the explanation display is switched and the desired terminology explanation is displayed (Step 122d). Assuming "print address" is selected here, examples of the index selection display and explanation display for that case are shown in FIGS. 9B and 9C. It is determined then whether the release key is depressed in succession to Step 122 (Step 123), if the release key is depressed, the processing unit 14 waits for the next key input in the text input mode.

When it is determined in Step 116 that the next key selected is not the help key 13, in Step 124 it is determined whether the key depressed is a character key, if it is a character key, character codes corresponding to the character key are stored in the text memory 18 (Step 125) and the processing unit 14 waits for the next key input.

When the help key 13 is not depressed in Step 117 after it has been depressed in Step 116, it is determined whether another key is depressed (Step 126). When a certain key is selected in Step 126, the key explanation message is displayed in the display unit 12 (Step 127), and if no key is selected, the processing returns to Step 117. Key explanation messages are, as shown in FIGS. 10A, 10B and 10C, constituted by statements which explain the function of the key selected and the operation for executing its function. FIG. 10A is a display showing an example of key explanation messages when the print stop key is depressed, similarly, FIG. 10B is an example of the key explanation message when using the half width key and FIG. 10C is that of the double width key. Then, it is determined whether the release key is depressed in succession to Step 127 (Step 128), and if then the processing unit 14 waits for the next key to be inputted.

Though embodiments in the Japanese word processor have been explained, it follows that they are also applicable in the other machines using the microprocessor such as the English word processor, personal computer and office computer.

According to the present invention, since the desired terminology can be retrieved easily among a number of terminologies at request of the user, and explanations of the function of retrieved terminologies and the key operation for executing its function can be displayed on the display means by simple key operation, it is easy to operate.

Moreover, when functions of some key itself are unknown, the user can obtain the explanation of the key functions by a simple key operation.

Furthermore, when an operational error occurs because of key input error, since the explanation statement giving the reason for that operational error is displayed automatically, only when required by the user, or when the error has occurred, for example, twice successively, an explanation statement can be obtained according to skill of the user.

What is claimed is:

1. An interactive help display apparatus with a plurality of memories and controls for displaying different modes comprising:

key input means, including at least one help key operatively associated with display means for displaying data, error detecting means for detecting operational errors of this input means, first memory means for storing explanations of operating methods actuated by the key input means, second memory means for storing a terminology index consisting of capital letters of terminologies, third memory means for storing a plurality of terminologies corresponding to the capital letters, fourth memory means for storing explanations of functions of the terminologies and operating methods for executing the functions, cursor means for indicating desired locations of data displayed on the display means of the capital letters from the second memory means, each of said memory means and said cursor means operatively associated with said display means, control means for controlling the display means, for displaying on the display means a plurality of displays, each display related to a different mode of operation;

a first display being explanations of operating methods for correcting an error, from the first memory means when the error detecting means detects an error and one help key is operated once, a second display being the terminology index consisting of capital letters of terminologies stored in the second memory means when the one help key or a second help key is successively operated twice, a third display being terminologies stored in the third memory means corresponding to capital letters, the capital letters identified by cursor means; and a fourth display being the stored content of the fourth memory means, which stores the explanation of functions of the terminologies and operating methods associated with the plurality of terminologies stored in the third memory means, so that a user upon actuation of the control means can display said plurality of displays by accessing said memories to identify unknown points of the system to correct errors.

2. The device according to claim 1 wherein one help key functions to provide a help display.

3. The device according to claim 1, wherein two help keys function to provide a help display.

4. The device according to claim 1, further including fifth memory means for storing explanations and operating methods for executing functions of the key input means, and said control means can display, on the display means, the stored content of said fifth memory means.

5. The device according to claim 1 wherein the error detecting means can detect a two time incorrect operation of the key input means, and said control means controls the displaying of the content of the first memory to display an operational error detected by the error detection means.

6. The device according to claim 1, wherein each of the terminologies are a heading word indicating a function of the device.

7. The device according to claim 1, wherein the stored capital letters are arranged in alphabetical order.

8. The device according to claim 7, wherein the alphabetical order is an alphabetical order of the Japanese language.

9. The device according to claim 6, wherein the stored capital letters are arranged in alphabetical order.

10. The device according to claim 9, wherein the alphabetical order is an alphabetical order of the Japanese language.

11. A method of performing an operator interactive help display with a help system that includes a key input with error detecting means and four memories, a first memory storing explanations of operating methods actuated by the key input, a second memory storing a terminology index consisting of capital letters of terminologies, a third memory storing a plurality of terminologies corresponding to the capital letters, a fourth memory for storing explanations of functions of the terminologies and operating methods for executing the functions, comprising the operator's sequential steps of:

(a) actuating a control when an error is detected, which includes operating a help key once for displaying on the display a first display that includes explanations of operating for explaining how to correct an error, the explanation fetched from the first memory;

(b) actuating the help key twice to display the terminology index consisting of the capital letters of terminologies stored in the second memory;

(c) identifying by using a cursor the capital letters on the display;

(d) actuating a control for displaying terminologies stored in the third memory corresponding to capital letters, and (e) actuating a control for displaying the contents of the fourth memory, which includes the explanations of functions of the terminologies and operating methods associated with the plurality of terminologies in the third memory.

* * * * *